(12) United States Patent
Spiro (10) Patent No.: US 8,474,164 B2
(45) Date of Patent: Jul. 2, 2013

(54) CHECKOUT DIVIDER WITH OPTICAL EFFECT

(75) Inventor: Steven M. Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 0 days.

(21) Appl. No.: 13/425,983

(22) Filed: Mar. 21, 2012

(65) Prior Publication Data

US 2012/0291321 A1 Nov. 22, 2012

Related U.S. Application Data

(60) Provisional application No. 61/465,694, filed on Mar. 23, 2011.

(51) Int. Cl.
*G03B 25/02* (2006.01)

(52) U.S. Cl.
USPC .................................. 40/454; 40/649; 40/661

(58) Field of Classification Search
USPC ................................ 40/454, 649, 661; 186/59
See application file for complete search history.

(56) References Cited

U.S. PATENT DOCUMENTS

| | | | | | |
|---|---|---|---|---|---|
| 4,534,126 | A | * | 8/1985 | Gilman | 40/661 |
| 4,663,872 | A | * | 5/1987 | Finger | 40/488 |
| 5,144,763 | A | * | 9/1992 | Calhoun | 40/506 |
| 5,450,926 | A | * | 9/1995 | Fraser | 186/59 |
| 5,933,994 | A | * | 8/1999 | Misaresh | 40/649 |
| 2003/0182836 | A1 | * | 10/2003 | Rodrigues et al. | 40/661 |
| 2003/0233775 | A1 | * | 12/2003 | Klopfer | 40/564 |
| 2009/0056181 | A1 | * | 3/2009 | Meyer et al. | 40/454 |

FOREIGN PATENT DOCUMENTS

GB 2330680 A * 4/1999

* cited by examiner

*Primary Examiner* — Gary Hoge
(74) *Attorney, Agent, or Firm* — Leason Ellis LLP (57) ABSTRACT

A checkout divider having an optically variable effect. The divider includes a sleeve including optically variable material that is disposed upon a face of the sleeve. The sleeve is formed to take on a three-dimensional structure. The divider includes a pair of end caps that are configured to fixedly receive each end of the sleeve. The divider also includes a curved bearing surface associated with the end caps. The curved bearing surface is disposable such that upon disturbance of an equilibrium of the checkout divider, the optically variable material exhibits a change in aspect.

19 Claims, 4 Drawing Sheets

Fig. 1 fig. 2 fig. 3 fig. 4

CHECKOUT DIVIDER WITH OPTICAL EFFECT

CROSS-REFERENCE TO RELATED APPLICATION

This application claims priority under 35 U.S.C. §119(e) to, U.S. patent application Ser. No. 61/465,694, filed Mar. 23, 2011, which is hereby incorporated by reference herein in its entirety.

TECHNICAL FIELD

The invention relates to checkout dividers and the like. Checkout dividers are commonly used to separate items that have been brought to a cashier's station for payment. They generally serve to differentiate successive customers' orders, but may also have additional functions. For example, they may serve as a location for advertising or promotion. They may also have a structural purpose beyond separating goods to be purchased, as in the case where they interrupt an optical sensor that controls a conveyor.

The invention also relates to picture mounts that provide a physical motion, particularly when the activated picture is an optically variable image such as a lenticular print or a hologram.

BACKGROUND

Checkout dividers were originally simple bars of wood of square section, on which was commonly printed the name of the retail establishment. Because of its proximity to the point of payment, it was found to be an attractive location for certain kinds of advertisement and display.

In order that the entire divider need not be discarded after each promotional campaign, checkout dividers including a clear outer sleeve eventually became widespread. Printed matter could be inserted into these sleeves and changed as desired. In such dividers, the printed matter is commonly retained by grooves in the transparent sleeve and by plastic end caps at each end.

Lenticular imaging has its own distinct history. Illusionistic lenticular effects directed in part to advertising were described in U.S. Pat. No. 592,631 issued in 1897 to Hollander. In 1899, a lenticular stereoscopic system for photography and printing was described by John Jacobson in U.S. Pat. No. 624,042 and U.S. Pat. No. 624,043. Optically variable lenticular signage was more thoroughly detailed by Curwen in U.S. Pat. No. 1,475,430. It may be appreciated that the utility of lenticular effects in marketing and consumer-directed imaging has long been understood.

In current practice, lenticular images are prepared by digitally interlacing a set of source images. This data file is then used to direct the printing of a physical image. The image may be printed directly to the reverse of a lens sheet, or may be printed separately and applied. Intermediately, the color channels may be printed on the lens and an opaque backer material such as paper or polymer film applied in a separate step.

Variable images using an opaque parallax barrier parallel and in some ways predate lenticular imaging. In May 1896 Swiss engineer Auguste Berthier published a description of his work in which he combined a vertical line screen with interlaced images to make stereoscopic images that could be viewed without glasses.

U.S. Pat. No. 725,527 issued to Frederic Ives describes a similar arrangement. Beginning in 1904, Eugène-Pierre Estanave applied Berthier's strategy to animate images, and by 1910 was combining depth and animation in a single image. Current images using such selective occlusion are sometimes made by printing a fine dot pattern on both sides of a clear sheet, rather than by a strict lineation.

In the scientific understanding, a hologram is a complex form of diffraction grating produced by capturing or synthesizing a field of interfering wavefronts. This original or synthesized scene may be reconstructed by illuminating the holographic record with a suitable directional light source.

The term "hologram" is used more loosely in the graphic arts to describe any graphic material that carries an ornamental diffraction gating. Diffraction gratings produce color and intensity variation by the interference of light, rather than selective light absorbents such as pigments or dyes.

Interference color, also known as structural color, characteristically changes in its visual properties depending on the relative position of the observer, the material, and the source of illumination. Diffractive graphic materials are often modified with tinting in the form of topcoats or local spot color to provide a particular chromatic effect.

The use of such manufactured diffractive reliefs in ornamentation and predates the invention of classical holography by several decades. For example, in U.S. Pat. No. 551,769 John Jacobson describes the fabrication of a turned die for the reproduction of iridescent, ornamental diffraction gratings. Additional methods and designs using diffractive materials are taught by Porter in U.S. Pat. No. 734,134, U.S. Pat. No. 734,135, and U.S. Pat. No. 734,361, by Doner in U.S. Pat. No. 1,354,471, and by Sylvester et al. in U.S. Pat. No. 2,875,543.

A third class of optically variable structured material employs gratings coarser than those needed to chromatically decompose light, yet still sufficient to impart a selectively directional effect. These reliefs may be combined with conscientiously applied transparent colorants to produce color effects in the absence of diffraction. Representative examples of this class of material are described in U.S. Pat. No. 1,996,539 to Dufay and UK 438236 to Weil.

Optically variable graphic materials can be made using refraction, occlusion, diffraction, or reflection, or any combination of these principles. These principles can be called upon to impart an image that conveys a variation with the relative position of the observer. These principle can be broadly employed to produce a range of effects, including animations, color shifts, alternating messages, or the impression of stereoscopic depth.

Visually variable images which are actuated by electromechanical means are also widely represented in the record. One standard method of eliciting an optical effect is to induce a relative motion between image and lens. Comparatively few lenticular products relate to passive motion or motion induced by an external source.

SUMMARY

Optically variable images are known to attract customers' attention and increase their retention of and responsiveness to advertisements. The invention proposes the use of optically variable material, particularly including lenticular material, in a checkout divider. It also proposes ways in which lenticular material may be used structurally in a checkout divider.

More particularly, the invention proposes the use of the printed lenticular material in a manner that makes a discrete transparent sleeve extraneous. In one embodiment of the invention, the lenticular material per se provides adequate rigidity. In another, an internal armature of a low-cost material such as polypropylene serves as a support structure for the external lenticular sheet that carries the changeable image, effect, or message.

The invention further proposes the use of a curved sectional profile so that the divider is prone to a passive rocking action. Rocking may be externally induced, for example, when the divider is set down on a counter, or when a conveyor stops or starts. The optically variable imagery and the divider may be compatibly devised to comply with a particular shape, or to target an anticipated customers' viewpoint.

DETAILED DESCRIPTION OF CERTAIN EMBODIMENTS

Conventionally, the sectional profile of a checkout divider includes at least one linear section so that the divider has a flat base and rests stably when in contact with a flat counter or conveyor. In the invention, the sectional profile that includes a potential contact location instead includes at least one curve. As a result, the contact region is a line rather than a rectangular area, enabling a passive rocking action.

Because a curve of constant curvature would result in a round tube that would not rest at a stable location, the sectional curve in designs formed according to the invention is accompanied by a change in radius, a cusp, a flat, or a reflexion. These discontinuities ensure that the divider will rock freely without rolling away from its intended position. The particular shape may be chosen according to the desired action.

For example, corners with a relatively small but geometrically continuous radius can be used in dividers designed to be self-righting. Corners discontinuities defined by a simple cusp can be used in dividers designed to exhibit a regular rocking action. A central curved region bracketed by two flat areas can encourage a bistable pattern of movement. Reflexed profiles, namely, those that imply a locally continuous physical surface that is both concave and convex, may be used to form a stop to impede rolling, or to expressly induce a more abrupt motion cycle.

These motions may be encouraged or enabled by the express inclusion of a weighted component of relatively high mass. The weighted component may be fixed or loose, and may include, for example, a rod or bar. Within the invention, it is also envisioned that a weighted component may also be an array of elements such as metal spheres, a granular material such as sand, or an encapsulated fluid. The weighted component may also be integrally formed as a feature of an extruded, cast, or molded part.

In the present invention, an optically variable image is compatibly devised and incorporated into such a rocking checkout divider. When placed on a planar surface, a divider formed in accordance with the invention will be in unstable contact with that surface. Any resulting rocking action will induce the optically variable material to exhibit its characteristic angular change in an alternating cycle.

In the subsequent descriptions, the invention applies the use of lenticular material. Lenticular material is generally thick relative to paper or synthetic paper-like media. For example, paper is commonly 0.075 mm (3 mils) thick, while lenticular lens is most commonly 0.25 mm to 0.75 mm (10 to 30 mils thick).

Furthermore, lenticular images carry their graphic impression on the rear surface, while more conventional media typically carry their printing of the exposed face. As a result, lenticular graphic surfaces are inherently protected, while conventional prints must be laminated with a polymer shield in order to obtain the same degree of mar resistance.

While neither the thickness nor a particular optical proportion is intended to be taken as a limitation of the invention, the intrinsic structure and relative rigidity of lenticular material is relevant to certain applications of the invention.

It is envisioned within the invention that sheet material including an optically variable image may be inserted into a rigid transparent sleeve. Some component of the device, such as the sleeve or its end caps, is formed such that when set on a planar surface, the completed device is free to rock.

However, in the case where any printed material in enclosed in a clear sleeve, the sleeve will produce two layers of reflection. Therefore, about 10% of ambient light is typically lost before it ever reaches the printed surface. Another 10% of light is reflected back on exit. The degree of interference by reflection increases with the obliqueness of the viewing angle. Furthermore, internal dust and condensation can mar the appearance of the divider over time.

Figure 1:
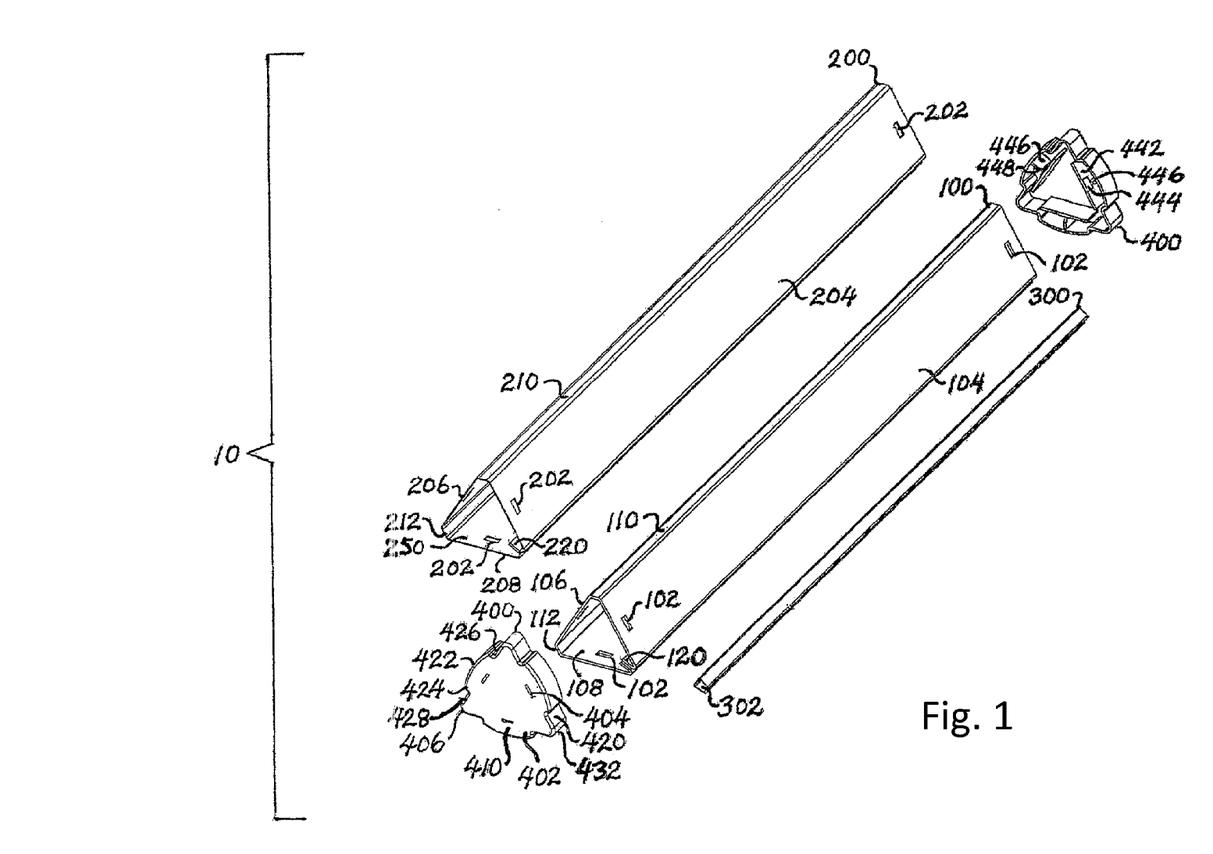
FIG. 1 shows an exploded perspective view of a checkout divider formed according to the invention.

Specific applications of the invention are therefore devised to locate the lenticulated surface as the outermost surface of the checkout divider. An exemplary version of a rocking lenticular divider 10 is shown in FIG. 1. The four discrete components of the illustrated embodiment include armature 100, lenticular sleeve 200, assembly spline 300, and two substantially identical end caps 400.

In this design, armature 100 is fabricated of sheet material, preferably a rigid, impact-resistant, low-cost polymer such as clarified polypropylene. The armature may alternately be formed of other polymers, cardboard, metal, or even milled wood, so long as the dimension and material properties suit the requirements of the invention.

The sheet material in the version detailed in the illustration of FIG. 1 is formed as a flat blank then folded into a three-dimensional structural shape. In this design, the anticipated component has a sectional profile that substantially conforms to an irregular but radially symmetrical hexagon.

The sheet material is initially cut to a rectangular pattern that is has a length equal to that of the finished armature, and a width slightly greater than the sum of the folded armatures' anticipated polygonal faces. The as yet unformed armature blank includes three armature retention slots 102 near each end. The retention slots are conscientiously located so that when the armature template is folded into three-dimensional form, at each end of the armature, one slot will be centered along each of the three long sides of the radially symmetrical hexagonal geometry of the end section.

Armature retention slots 102 are set back from the edge of the blank from which armature is formed enough so that ready deflection of the region between the slot and the edge of the blank can occur during assembly, yet leaving sufficient material to reasonably deter breakage of the remaining material. A 3 mm (⅛") spacing of the slot from the edge of the blank is typically sufficient. Minimum practicable dimensions can take into account the complimentary structural effect of the similarly slotted lenticular sleeve 200.

In the interest of efficiency, several blanks, including any apertures, perforations, creases, etc., may be die-cut simultaneously. Lighter gauges of polymer sheet may be cut using a steel-rule die. Alternately, a milled steel matching die set may be used to cut the blanks. Fabrication of the three-dimensional form of the armature from its initial flat state is achieved by folding of the sheet material. Folding along predetermined lines may be encouraged by scoring, partial cutting, perforating, heating, or any combination of such techniques.

It may be seen by reference to FIG. 1 that the three-dimensional form of armature 100 includes three relatively large faces, 104, 106, and 108. The form of the armature also includes two smaller faces, 110 and 112. Where a third face would occur geometrically, a loose joint is formed by turning two meeting edges of the blank inward to form two armature seam extensions 120. These two long tabs may touch or nearly touch, but in any case should be formed in a way that will subsequently admit correspondingly formed seam features on lenticular sleeve 200.

The lenticular transparent stock material used in lenticular sleeve 200 is typically extruded from PETG copolymer (glycol-modified polyethylene terephthalate) or APET (Amorphous Polyethylene Terephthalate), but may be formed in a number of ways out of any suitable transparent polymeric material. The lenticular material carries an image on its planar back surface, which may be printed directly, or printed on a separate sheet of material and then applied. The subject matter and the elected optical variance of the image may be freely adapted to the targeted class of viewers, and are not limited by the invention.

It may be seen that lenticular sleeve 200 substantially follows the form of armature 100. Lenticular retention slots 202 provide holding locations, and are designed to correspond with the position of the retention slots in the internal armature. The three-dimensional form of lenticular sleeve 200 also includes three relatively large lenticular faces, 204, 206, and 208. The form of the lenticular sleeve also includes two smaller lenticular faces, 210 and 212.

A loose joint is analogously formed in the lenticular sleeve by turning two meeting edges of the blank inward to form two lenticular seam extensions 220. These seam extensions may be devised meet more closely than those formed in armature 100, as the abutted lenticular seam extensions are intended to slip between the armatures' own seam extensions.

Lenticular sleeve carries lenticular image 250. Lenticular image 250 may include single plural layers of image-forming materials such as inks, dyes, pigments, toners, colorants, or photographic emulsions. It may also include pervasive coatings such as one or more flood coats of opaque or translucent white ink. The lenticular image may also include a discrete applied backer, such as polyester film or paper. The applied backer may carry the printed image, but may be blank in the case where the lens sheet carries printing on its reverse.

The rigidity of the armature and the lenticular sleeve materials may be sufficient to retain the folded material with its long edge continuously abutted throughout its length. Nevertheless, an assembly spline may be included to further secure the joint. Optional assembly spline 300 may be a channel of extruded aluminum, but may also be any rigid or semi-rigid polymer, such as polystyrene, acrylonitrile butadiene styrene (ABS), high density polyethylene (HDPE), or butyrate. Assembly spline 300 includes channel 302 which is dimensioned, in this exemplary implementation, to receive and hold in tension a stack equal to two layers of the armature plus two layers of the lenticular material.

End caps 400 expressly include means to holding the checkout divider assembly together, and also provide a bearing surface whose intermittently curved profile permits a rocking action to occur. The end cap may be injection-molded of any suitable thermoplastic polymer, such as polypropylene. Referring again to the accompanying drawing of FIG. 1, each end cap 400 exhibits threefold radial symmetry, such that the same features are repeated over a 120° angle. In general, these features are mindfully formed to facilitate the assembly of the device or to regulate the rocking quality of the assembled product.

The foreground of the perspective image shows the external features of end cap 400. External face 410 of end cap 400 includes planar face 402. Planar face 402 is penetrated by three release slots 404. Release slots 404 are left by mold pins (not shown) of corresponding rectangular section that are withdrawn during the mold parting. The mold pins assist in freeing undercuts in the molded end cap that would otherwise risk being entrapped owing to a negative draft angle.

Other designs may readily envisioned within the invention with locking tapers or other connection features that do not entail negative draft angles, so such specific structural features herein described should be understood to reflect a completeness of description rather than an intended limitation of the present invention.

Bevel 406 joins the external face to end cap sidewall 420. End cap rim 420 includes three convex rocker regions 422 which terminate at each end in cusps 424 that connect with concavities 426, and planar rim sections 428. Convex end stops 432 are situated between two planar rim sections 428. The radius of curvature of the convex end stops is small relative to that of the convex rockers.

The internal features of end cap 400 can be seen in the second and identical end cap, which is shown as if facing the viewer in the background of FIG. 1. Support wall 442 joins the interior face of end panel 402 along one edge. Support wall 442 includes ramp tab 444. Ramp tab 444 is inclined away from the exposed edge of support wall 442. Guide rib 446 is substantially rectangular in form, perpendicular to but unconnected to support wall 442, and is joined along two sides by the interior faces of end panel 402 and sidewall 420. The only corner of the rectangular guide rib that is not coincident with the walls of the part includes guide radius 448.

OPERATION OF THE INVENTION

The article depicted in FIG. 1 is devised to be quickly and simply assembled. Armature 100 and lenticular sleeve 200 are slidably engaged such that the two armature seam extensions 120 are located between lenticular seam extensions 220 and so that the lenticular sleeve is held just outside the sectional profile armature. Lenticular sleeve 200 and armature 100 are then slid together until their ends are substantially aligned and the six armature retention slots 102 align with the six lenticular retention slots 202.

Optionally, assembly spline 300 may be inserted on the cavity side of the layered assembly and slid over the stack of lenticular and armature material at the location that includes the four engaged seam extensions. Assembly spline 300 may impart a degree of clamping force upon the formed and assembled sheet goods so that the parts are held in a rigid shape.

The sleeve assembly, which includes the aligned armature and lenticular sleeve, is then fitted to end caps 400. At three locations on each end cap, the layered sleeve assembly is introduced between support wall 442 and the corner radius of guide rib 446. The three armature retention slots 102 aligned with the three lenticular retention slots 202 at each end of the sleeve assembly are in turn aligned with the three ramp tabs in each end cap, and the parts engaged. Support wall 442 that includes ramp tab 444 deflects slightly, as the sleeve material does the same in an opposite fashion. When the leading side of the retention slots reaches over the peak of the ramp tab, the forced flexure of the support wall and of the sleeve assembly is released and the parts snap together.

Depending on the materials and the design of the connection features, the join may be reversible or effectively permanent. For example, a thicker support wall will require greater force to deflect, and therefore will more aggressively resist disassembly. A ramp with zero back slope can result in an effectively permanent connection. Alternately, a few degrees of back slope will provide reliable retention, but will provide a ramping effect in reverse. This back slope allows the parts to be repeatedly assembled and separated, a property which permits substitution of the printed material.

In the use of the invention, the divider is typically taken in hand by a customer and laid across a counter or conveyor. In the case of the static counter, it is anticipated that a customer will typically release the divider in such a way that the divider will rock due to the residual momentum of that handling.

In the case of an intermittently moving conveyor, that action may be supplemented by the intermittent operation of the conveyor. Both starting and stopping the conveyor can prompt the rocking action.

Figure 2:
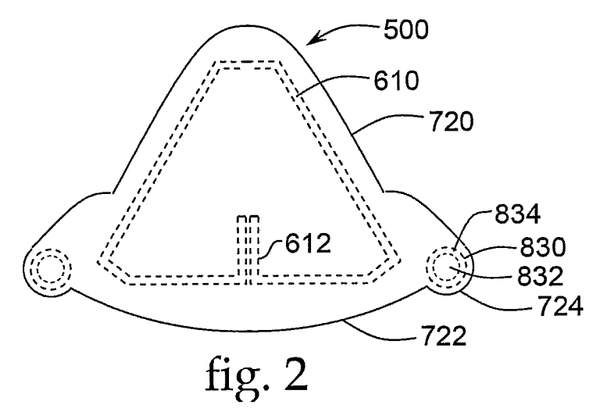
FIG. 2 illustrates an end view of an alternate embodiment showing a design having bilateral symmetry.
Figure 3:
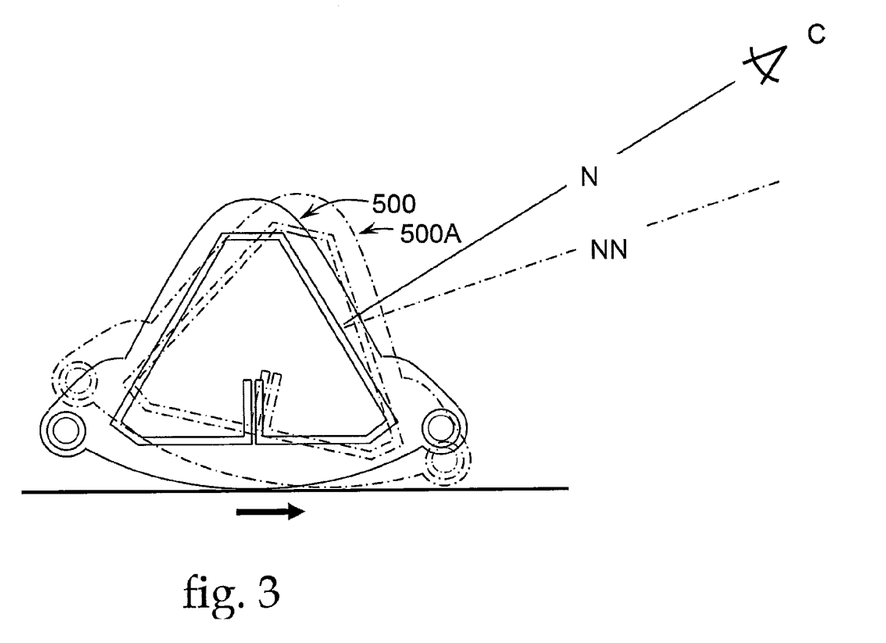
FIG. 3 shows the behavior of the divider upon a conveyor when the conveyor stops.
Figure 4:
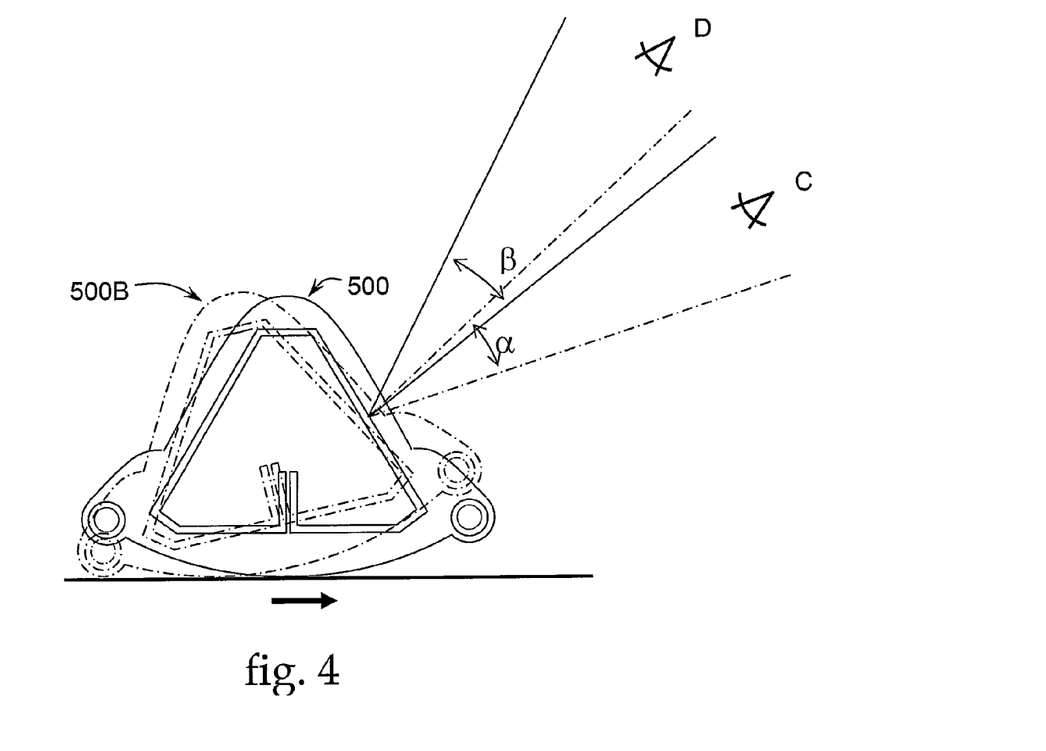
FIG. 4 shows the behavior of the divider upon a conveyor when the conveyor is restarted, and furthermore shows an alternate elevated viewing range.

This circumstance may be appreciated by further reference to FIGS. 2 through 4 inclusive. FIGS. 2 through 4 illustrate an alternate embodiment of the invention that is designed on a premise of bilateral symmetry rather than radial symmetry. In the case shown, there is typically be a region that is designated as the surface contact side, and two faces designated as display surfaces. However, the elicitation of the optically variable effect by a passive force is comparable, whether the invention is in the form exemplified by FIG. 1, or in the form exemplified by FIGS. 2 through 4.

FIG. 2 shows bilateral divider 500. Bilateral divider 500 includes sleeve structure 610, which includes bilateral seam extensions 612. Bilateral end caps 720 include curved base 722 and two rounded stops 724. Weights 830 may be made of metal bars 832 having a polymer coating 834 which can be attractively colored. The sleeve structure 610 mates with the end caps 720 and as in the previous embodiment, the end caps 720 can mate with the sleeve 610 in any number of different manners, including the use of locking slots and locking tabs as in FIG. 1. In addition, the end caps 720 can mate with the sleeve structure 610 using the seam extensions 612. For example, the seam extensions 612 can mate with a complementary seam structure formed in the end caps. In another embodiment, an armature, similar to that in FIG. 1 can be received within the sleeve structure and mated thereto.

FIGS. 3 and 4 show the device of FIG. 2 in operation. The bold arrow indicates the direction of motion in a conveyor. Bilateral divider 500 is shown in an upright position. FIG. 3 illustrates that when the conveyor slows abruptly or stops, the divider will be cast forward by its residual momentum, as indicated by forward alternate position 500A.

Assuming the lenses are running along the lenticular sleeve rather than around it, lenses will surround a central perpendicular optical normal N. Upon disturbance of the equilibrium of the divider and the resulting angular movement, the central optical normal shifts to axis NN, and an observer at C will accordingly see a change in the aspect of the optically variable material.

Upon restarting the conveyor, the divider will tilt backward as shown in FIG. 4. The particular design and location of the stops will determine the degree of angular variation □ that the optically variable material will exhibit to an observer at C over its full range of forward and rearward motion.

There are many variations and applications that fall within the intended scope of the invention. The bilaterally symmetrical version, for example, is devised to be consistently oriented so that it has an intrinsic top and bottom. The image bands in the interlaced image need not be centered on the central lens normal, but may be conscientiously offset, for example, to target a different viewing range. For example, as shown in FIG. 4, the interlaced image field may be shifted downward on each side so that instead of exhibiting angular variation over □, the optically variable material will exhibit that variation over βAngular range βtargets a viewer at the relatively elevated location D.

The lenticular sleeve need not be formed to have only planar sides. The sides, for example may be concave or convex. If the sides are convex, the spatial frequency of the interlaced image bands may be decreased so that the desired sight-lines are preserved. Conversely, if the sides are concave, the spatial frequency of the interlaced image bands may be decreased. Again, the set of image bands need not be centered on the face, but may be freely situated in an optimal way for each surface, whether curved or flat.

It should be understood that there are various modes of operation within the invention. For example, the rocking may be cyclical or oscillating, but it may also be bistable. Namely, the divider may be devised to rest stably in a forward-tilted position or rearward-tilted position, while being imbalanced at any position in between. In this way discretely alternate messages may be displayed upon starting and stopping a conveyor. The base can have smaller radius of curvature at the center to promote this action. The bistable behavior can be further encouraged by the location of weights at location away from the bilateral line of symmetry.

Given lenticular material of sufficient gauge, the armature structure may be redundant, and may be electively omitted. Lenses will typically exhibit the most potential variation when run along the length of the divider, but they may also run across the divider, or diagonally to it. The device may include internal illumination. The illumination may be motion-activated. Illumination may be provided by light-emitting diodes. The light may be powered by batteries. The batteries may be rechargeable, and may be recharged by photovoltaic cells, by direct electrical contact, or by induction.

It will be understood that when the optically varying material is in the form of a lenticular lens, the optical effect is a lenticular effect.

The foregoing descriptions should be considered to serve the requirements of enablement and disclosure of the invention, and should not be taken to limit its intended scope.

The invention therefore encompasses countless specific implementations of an optically variable checkout divider.

The invention therefore should not be taken to be constrained by the examples described in application, but rather should be understood to be limited only by the broadest reading of any claims subsequently appended in the pursuit of this application and any of its dependent, divisional or derivative forms.

What is claimed is:

1. A checkout divider having an optically variable effect, comprising:
   a sleeve including optically variable material, the optically variable material being disposed upon a face of the sleeve, the sleeve being formed to take on a three-dimensional structure;

a pair of end caps, the end caps being configured to fixedly receive each end of the sleeve;
a curved bearing surface associated with the end caps, the curved bearing surface being disposable such that upon disturbance of an equilibrium of the checkout divider, the optically variable material exhibits a change in aspect; and
an elongated armature having a first end and an opposing second end, the armature being a hollow structure and constructed to be received within a hollow interior of the sleeve, thereby resulting in the sleeve surrounding the armature, wherein each of the armature and sleeve have a substantially triangular shape defined by three walls.

2. The divider of claim 1, wherein the optically variable material comprises a lenticular image.

3. The divider of claim 1, wherein the sleeve structure has a substantially uniform thickness.

4. The divider of claim 1, wherein the sleeve comprises a lenticular sleeve formed of curved outer walls that define the three dimensional structure.

5. A checkout divider having an optically variable effect, comprising:
a sleeve including optically variable material, the optically variable material being disposed upon a face of the sleeve, the sleeve being formed to take on a three-dimensional structure;
a pair of end caps, the end caps being configured to fixedly receive each end of the sleeve;
a curved bearing surface associated with the end caps, the curved bearing surface being disposable such that upon disturbance of an equilibrium of the checkout divider, the optically variable material exhibits a change in aspect; and
an elongated armature having a first end and an opposing second end, the armature being a hollow structure and constructed to be received within a hollow interior of the sleeve, thereby resulting in the sleeve surrounding the armature, wherein the armature includes a loose joint defined by two abutting walls, the loose joint being defined by a pair of seam extensions that face inwardly into a hollow interior of the armature.

6. The divider of claim 5, wherein the sleeve includes a loose joint defined by two abutting walls, the loose joint being defined by a pair of seam extensions that face inwardly into a hollow interior of the armature, wherein the seam extensions of the sleeve are disposed between the seam extensions of the armature, thereby coupling the sleeve to the armature.

7. The divider of claim 6, further including an assembly spline having a channel defined therein, the channel receiving the seam extensions of the armature and the sleeve which are disposed in a layered arrangement.

8. A checkout divider having an optically variable effect, comprising:
a sleeve including optically variable material, the optically variable material being disposed upon a face of the sleeve, the sleeve being formed to take on a three-dimensional structure;
a pair of end caps, the end caps being configured to fixedly receive each end of the sleeve;
a curved bearing surface associated with the end caps, the curved bearing surface being disposable such that upon disturbance of an equilibrium of the checkout divider, the optically variable material exhibits a change in aspect; and
an elongated armature having a first end and an opposing second end, the armature being a hollow structure and constructed to be received within a hollow interior of the sleeve, thereby resulting in the sleeve surrounding the armature, wherein each of the armature and the sleeve includes a plurality of locking slots formed therein and when the armature and sleeve are properly assembled, the locking slots formed in the sleeve and the armature are in registration with one another, each end cap including a locking tab that is received within the registered locking slots formed in the sleeve and the armature.

9. The divider of claim 8, wherein the locking slots are formed at opposing ends of each of the sleeve and the armature.

10. A checkout divider having an optically variable effect, comprising:
a sleeve including optically variable material the optically variable material being disposed upon a face of the sleeve, the sleeve being formed to take on a three-dimensional structure;
a pair of end caps, the end caps being configured to fixedly receive each end of the sleeve; and
a curved bearing surface associated with the end caps, the curved bearing surface being disposable such that upon disturbance of an equilibrium of the checkout divider, the optically variable material exhibits a change in aspect, wherein the end cap includes an outer perimeter wall and a plurality of inner support walls that are spaced from the outer perimeter wall, wherein locking tabs are formed on the inner support walls facing the outer perimeter wall, the locking tabs for reception in locking slots formed in the sleeve, thereby fixedly attaching the sleeve to the end caps.

11. The divider of claim 10, wherein the locking tabs are ramp structures.

12. A checkout divider having an optically variable effect, comprising:
a sleeve including optically variable material, the optically variable material being disposed upon a face of the sleeve, the sleeve being formed to take on a three-dimensional structure;
a pair of end caps, the end caps being configured to fixedly receive each end of the sleeve; and
a curved bearing surface associated with the end caps, the curved bearing surface being disposable such that upon disturbance of an equilibrium of the checkout divider, the optically variable material exhibits a change in aspect, wherein the end cap includes three fold radial symmetry.

13. The divider of claim 12, wherein the end cap includes three convex rocker regions which terminate at each end in cusps and the end cap further includes convex end stops.

14. A checkout divider having an optically variable effect and bilateral symmetry, comprising:
a sleeve including optically variable material, the optically variable material being disposed upon at least one face of the sleeve, the sleeve being formed to take on a three-dimensional structure, wherein the sleeve includes bilateral seam extensions that extend inwardly into a hollow interior of the sleeve;
a pair of end caps, the end caps being configured to fixedly receive each end of the sleeve; and
a curved bearing surface associated with the end caps, the curved bearing surface being disposable such that upon disturbance of an equilibrium of the checkout divider, the optically variable material exhibits a change in aspect;
wherein the end cap includes a pair of rounded stops with the curved bearing surface being disposed therebetween to limit a degree of rocking action of the divider.

15. The divider of claim 14, wherein each of the rounded stops includes a weight.

16. The divider of claim 15, wherein the weight comprises a metal bar.

17. The divider of claim 14, wherein the optically variable material comprises a lenticular material.

18. The divider of claim 17, wherein lenticular lenses extend longitudinally along the sleeve as opposed to extending around the sleeve and therefore the lenticular lenses surround a central perpendicular optical normal, whereupon the disturbance of the equilibrium and resulting angular movement, the central perpendicular optical normal shifts, thereby resulting in the change in aspect being observed.

19. The divider of claim 18, wherein image bands in an interlaced image are not centered on central perpendicular optical normal but are offset therefrom to target a different viewing range in which the change in aspect is observed.

* * * * *